United States Patent [19]

Fujita et al.

[11] Patent Number: 4,990,911

[45] Date of Patent: Feb. 5, 1991

[54] SAMPLING FREQUENCY CONVERTER

[75] Inventors: Tadao Fujita, Kanagawa; Jun Takayama, Tokyo; Takeshi Ninomiya, Kanagawa; Yoshikazu Kurose, Kanagawa; Yoshiaki Inaba, Kanagawa, all of Japan

[73] Assignee: Sony Corporation, Tokyo, Japan

[21] Appl. No.: 332,899

[22] Filed: Apr. 4, 1989

[30] Foreign Application Priority Data

Apr. 8, 1988 [JP] Japan .................................. 63-086678

[51] Int. Cl.⁵ ............................................. H03M 1/86
[52] U.S. Cl. ...................................... 341/123; 341/54; 328/15; 328/55
[58] Field of Search ..................... 341/54, 52, 64, 152, 341/157, 123, 122, 124, 125; 328/15, 17, 25, 34, 55, 219.1, 271; 364/724.1

[56] References Cited

U.S. PATENT DOCUMENTS

| | | | |
|---|---|---|---|
| 4,301,446 | 1/1981 | Petit | 341/166 |
| 4,528,551 | 7/1985 | Agrawal | 375/27 |
| 4,684,925 | 8/1987 | Maruta | 340/347 AD |

Primary Examiner—William M. Shoop, Jr.
Assistant Examiner—Brian K. Young
Attorney, Agent, or Firm—Alvin Sinderbrand

[57] ABSTRACT

A relatively simplified sampling frequency converter for use in a format conversion apparatus is operative to convert sampled input data of an input sampling frequency into sampled output data of an output sampling frequency. The converter has an over-sampling circuit for increasing the sampling frequency of the sampled input data by a predetermined factor or coefficient to provide over-sampled data; an output data extractor for periodically extracting data from the over-sampled data in response to a timing pulse having the output sampling frequency; and a controller for controlling the phase of the timing pulse which controls the phase of the sampled output data.

6 Claims, 10 Drawing Sheets

SAMPLING FREQUENCY CONVERTER

BACKGROUND OF THE INVENTION

1. Field of the Invention

The present invention relates to a sampling frequency converter for converting a digital signal of a first sampling frequency into a digital signal of a second sampling frequency and, more particularly, to a sampling frequency converter adapted for use in conversion of the sampling rate or the like of a digital color video signal.

2. Description of the Prior Art:

In digital color signal formats, there is a known 4:2:2 format, also termed D-1 format which employs a digital component signal such that a luminance signal Y has a sampling frequency $f_1$ of 13.5 MHz, while each of color difference signals R-Y and B-Y has a sampling frequency of 6.75 MHz which is equal to one half of the frequency $f_1$. In contrast therewith, a composite color signal in the NTSC format, which is directly digitized and has a sampling frequency $f_2$, set to an integral multiple of a color subcarrier frequency $f_{SC}$, e.g. $4f_{SC}$ ($\approx 14.318$ MHz). Therefore to execute signal conversion between these signals, it is first necessary to execute sampling frequency (sampling rate) conversion between the two frequencies $f_1$ and $f_2$.

The R-Y and B-Y signals of the 4:2:2 format are both obtained by sampling at the frequency $f_1/2$; whereas the composite signal of the NTSC format is obtained by superimposing on the Y (luminance) signal, the carrier color signal produced by a quadrature two-phase modulation of the color subcarrier with the I and Q signals. Therefore, when the signal produced by sampling such a composite signal at the frequency $f_2$ ($=4f_{SC}$) is color-decoded, the I and Q signal data are obtained alternately per period $1/f_2$ (per 90° of color subcarrier) as will be described later. That is, the decoded digital I and Q signals are such that the sampling frequency thereof is $f_2/2$ ($=2f_{SC}$) and an offset corresponding to $1/f_2 = \frac{1}{4} f_{SC}$ (90° phase of color subcarrier) is existent therebetween. This phase difference between the sampling points of the I and the Q signal data necessitates interpolation to obtain components coincident in timing with the I and Q signals before or after conversion of the sampling frequencies when calculating the R-Y and B-Y signals from the I and Q signals by matrix operations.

Figure 1:
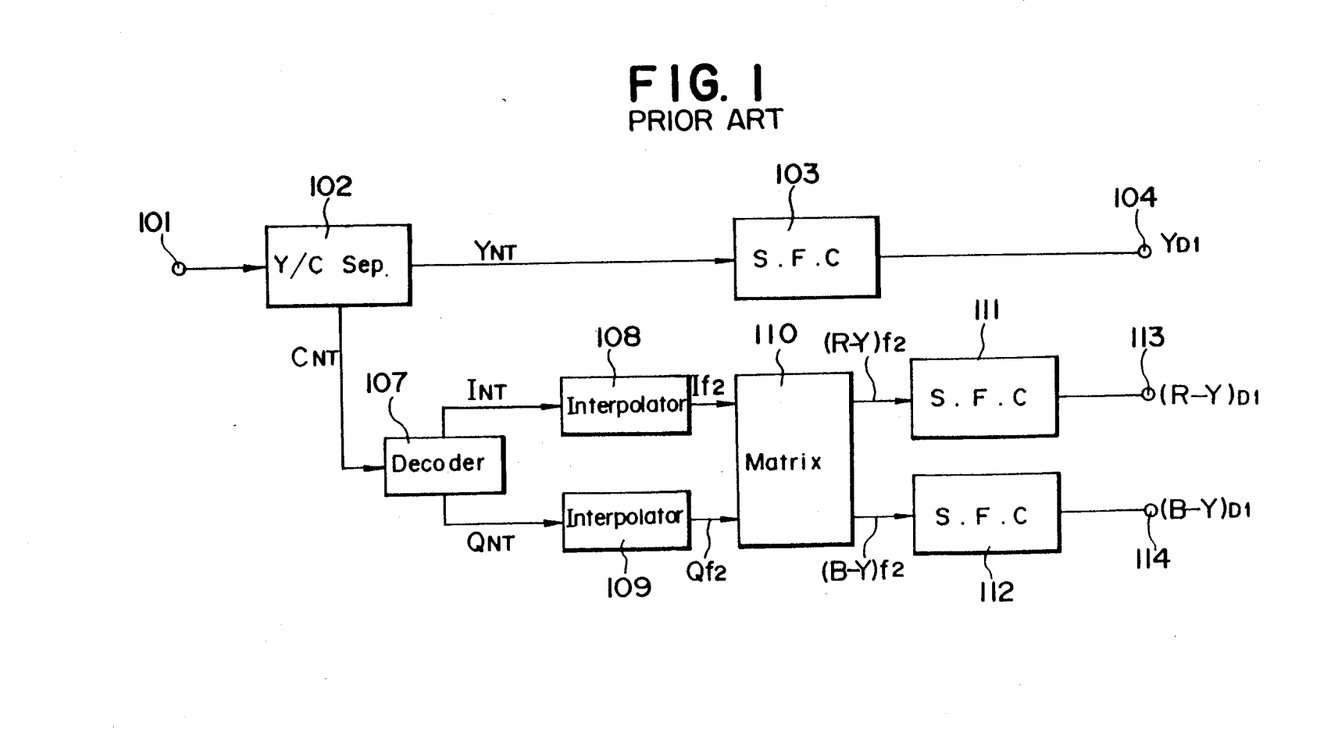
FIG. 1 is a block diagram showing a format conversion apparatus designed for converting a composite digital color television signal into component digital color television signals according to the prior art.
Figure 2:
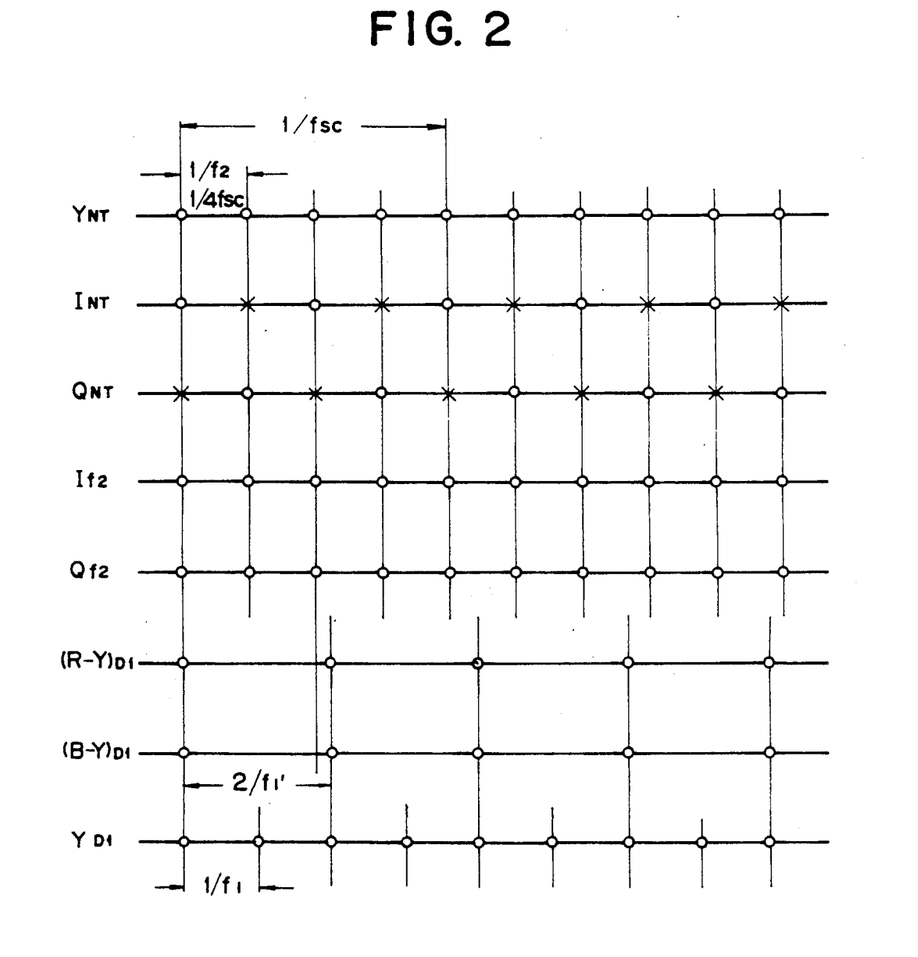
FIG. 2 is a diagram useful in understanding the operation of the prior art format conversion apparatus illustrated in FIG. 1.

FIG. 1 shows an exemplary conversion apparatus designed for converting a digital composite signal in the NTSC format into digital component signals in the 4:2:2 format (D-1 format). The NTSC formatted digital composite signal (sampling frequency $f_2 = 4f_{SC}$) is fed to an input terminal 101 in FIG. 1 and is separated into a $Y_{NT}$ signal and a $C_{NT}$ signal (where the subscript NT denotes the NTSC format) by a digital Y/C separator 102. As shown in FIG. 2, the $Y_{NT}$ signal is composed of a sample data row having the aforementioned frequency $f_2$ ($=4f_{SC}$) which corresponds to a $\frac{1}{4}f_{SC}$ period. The $Y_{NT}$ signal is fed to a sampling frequency converter (sampling rate converter) 103 and is thereby converted into a luminance signal $Y_{D1}$ with the aforementioned D-1 standard sampling frequency $f_1$ ($=13.5$ MHz). Such luminance signal $Y_{D1}$ is taken out from a Y output terminal 104. Meanwhile, the $C_{NT}$ signal obtained from the Y/C separator 102 is fed to a decoder 107, which outputs decoded digital $I_{NT}$ and $Q_{NT}$ signals. The I and Q signals are decoded in the following manner. The original analog carrier color signal C in the NTSC format is expressed as:

$$C = I \cos(\Omega_{SC} t + \Phi) + Q \sin(\Omega_{SC} t + \Phi)$$

where
$$\Omega_{SC} = 2\pi f_{SC}$$

Suppose that the phase (or the position on the time base), in sampling at the frequency $f_2$ ($=4f_{SC}$), increases stepwise from 0 with a unitary angle of $\pi/2$ ($=90°$) as 0, $\pi/2$, $\pi$, ... and so forth. The digital carrier color signal $C_{NT}$ itself is then changed as I, Q, -I, -Q and so forth per $\frac{1}{4}f_{SC}$. Therefore, in the decoder 107, the data row of the input color signal $C_{NT}$ is separated into I and Q per $\frac{1}{4}f_{SC}$ (with period $\frac{1}{2}f_{SC}$) while being sequentially multiplied by $\pm 1$, thereby producing signals $I_{NT}$ and $Q_{NT}$ as shown in FIG. 2. Both $I_{NT}$ and $Q_{NT}$ have the same sampling frequency $2f_{SC}$ and the time difference (offset) between the data of these signals is equal to $\frac{1}{4}f_{SC}$. Since it is impossible to execute a matrix calculation for obtaining R-Y, B-Y and so forth by the use of such I and Q signal data with different sampling points, the data at the sampling points (denoted by x on the signals $I_{NT}$ and $Q_{NT}$ in FIG. 2) of the other signals are interpolated by means of interpolators 108 and 109. This produces signals $I_{f2}$ and $Q_{f2}$ (shown in FIG. 2) having the same frequency $F_2$ ($=4f_{SC}$) with mutually equal sampling points. A matrix calculation, using such signals $If_2$ and $Qf_2$, is executed in a matrix calculator 110 producing signals (R-Y)$f_2$ and (B-Y)$f_2$ having the same sampling frequency $f_2$ ($=4f_{SC}$). Such signals (R-Y)$f_2$ are converted by sampling frequency converters 111 and 112, respectively, into signals (R-Y)$_{D1}$ and (B-Y)$_{D1}$ at a mutually equal sampling frequency, $f_1/2$, as shown in FIG. 2, and then are taken out from output terminals 113 and 114, respectively.

Figure 3:
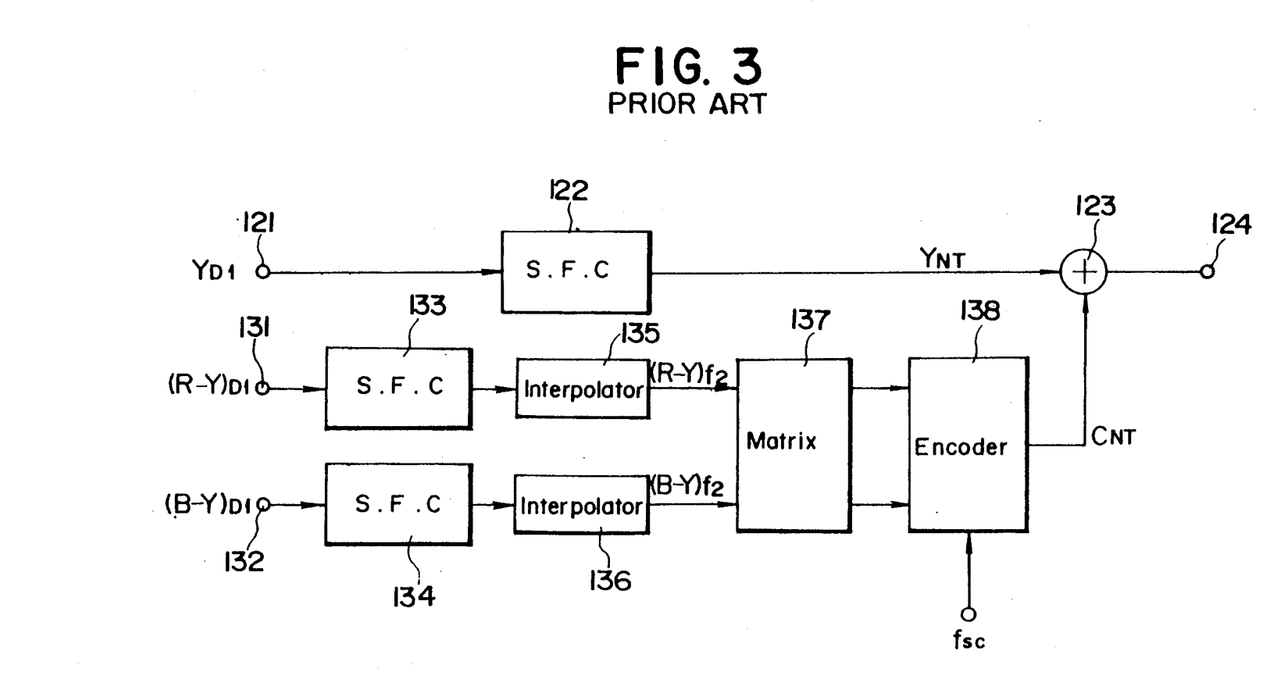
FIG. 3 is a block diagram showing a format conversion apparatus designed for converting component digital color television signals into a composite digital color television signal according to the prior art.

FIG. 3 shows an exemplary format conversion circuit for converting a signal in the D-1 format (4:2:2 format) into a digital composite signal in the NTSC format, which is an inverse operation, with respect to the above. A signal $Y_{D1}$ fed to an input terminal 121 is supplied directly to a sampling frequency converter 122 where the frequency $f_1$ is converted into a frequency $f_2$, changing the signal $Y_{D1}$ to a signal $Y_{NT}$ which is sent to an adder 123. The color difference signals (R-Y)$_{D1}$ and (B-Y)$_{D1}$ supplied to input terminals 131 and 132, respectively, are fed to sampling frequency converters 133 and 134, respectively where the frequency $f_1/2$ is converted into a frequency $f_2/2$ ($=2f_{SC}$) and then fed to interpolators 135 and 136, respectively, to become signals (R-Y)$f_2$ and (B-Y)$f_2$ having a sampling frequency $f_2$ ($=4f_{SC}$). Said signals are fed into a matrix calculator 137 becoming signals $I_{f2}$ and $Q_{f2}$ with a sampling frequency $f_2$ ($=4f_{SC}$), which are fed into a modulator 138 where a signal with a frequency $f_{SC}$ is modulated producing a digital carrier color signal $C_{NT}$. Said modulation is performed sequentially by repetitively substituting values (1, 0), (0, 1), (-1, 0) and (0, -1) per sampling period $\frac{1}{4}f_{SC}$ for the cosine value and the sine value in the aforementioned analog carrier color signal expressed below:

$$C = I \cos(\Omega_{SC} t + \Phi) + Q \sin(\Omega_{SC} t + \Phi)$$

where
$$\Omega_{SC} = 2\pi f_{SC}.$$

Said modulation produces I and Q signal data which appear alternately per sampling period $\frac{1}{4}f_{SC}$. The obtained digital carrier color signal $C_{NT}$, with sampling frequency $4f_{SC}$, is fed to adder 123 and is thereby superimposed on the digital luminance signal $Y_{NT}$, producing an NTSC digital composite signal with sampling frequency $4f_{SC}$ which is taken out from an output terminal 124.

Since the above-described format conversion apparatus requires both interpolators and sampling frequency converters this produces problems in that the characteristic signal becomes somewhat deteriorated during each signal processing stage and also adds to the complexity of the circuit configuration.

When a composite signal of the NTSC format is converted into component signals of the 4:2:2 format as shown in FIG. 1, a discrepancy between the group delays of the luminance signal $Y_{NT}$ and the chrominance signal $C_{NT}$ results. This is partly because the respective frequency characteristics of the circuits for the luminance signal $Y_{NT}$ and the chrominance signal $C_{NT}$ are different, hence the filter characteristics for the sampling frequency conversion are also mutually different. Furthermore, due to decoder 107 and interpolators 108 and 109, the processing time required for the chrominance signal is longer than the luminance signal line, inducing a further difference between the respective group delay characteristics. The maximum error caused in correcting the discrepancies between the group delays of the two signals, by use of an ordinary sample delay method of similar means, is $\pm T_1/2$, approximately 37 ns when the sampling period on the output side of the 4:2:2 format is set to T1, which is approximately 74 ns since $f_1 = 1/T_1 = 13.5$ MHz. Accordingly, some harmful influence such as color deviation may occur in the reproduced image. Likewise, in converting 4:2:2 format into the NTSC format as shown in FIG. 3, a group delay problem may arise between the luminance signal and the color difference signals due to the influence of the video signal processing characteristics and the recording and reproducing characteristics. This group delay discrepancy may exert some harmful influence on the image should the correction be performed merely per sampling period since the error is not sufficiently diminished as to be permissible.

OBJECTS AND SUMMARY OF THE INVENTION

Therefore, it is an object of the present invention to provide a sampling frequency converter for use in a format conversion apparatus which overcomes the aforementioned drawbacks and disadvantages observed in the prior art.

More specifically, it is an object of the present invention to provide a sampling frequency converter which has a simplified arrangement for use in a format conversion apparatus to process different digital color television signals.

A further object of the invention is to provide a sampling frequency converter with a high-accuracy interpolating function for use in a format conversion apparatus to process different digital color television signals.

Various other subjects, advantages and features of the present invention will become readily apparent from the ensuing detailed description of the preferred embodiments of the invention when read in construction with the accompanying drawings.

In accordance with an aspect of this invention, in a sampling frequency converter for converting sampled input data having an input sampling frequency into sampled output data having a different output sampling frequency, the sampled input data is supplied to an over-sampling circuit by which the sampling frequency is increased to provide over-sampled data, a timing pulse is generated with the output sampling frequency, output data is periodically extracted from the over-sampled data in response to the timing pulse, and the phase of the timing pulse is controlled for controlling the phase of the sampled output data.

DETAILED DESCRIPTION OF THE PREFERRED EMBODIMENTS

Hereinafter, the preferred embodiments of the present invention will be described with reference to the accompanying drawings.

Figure 4:
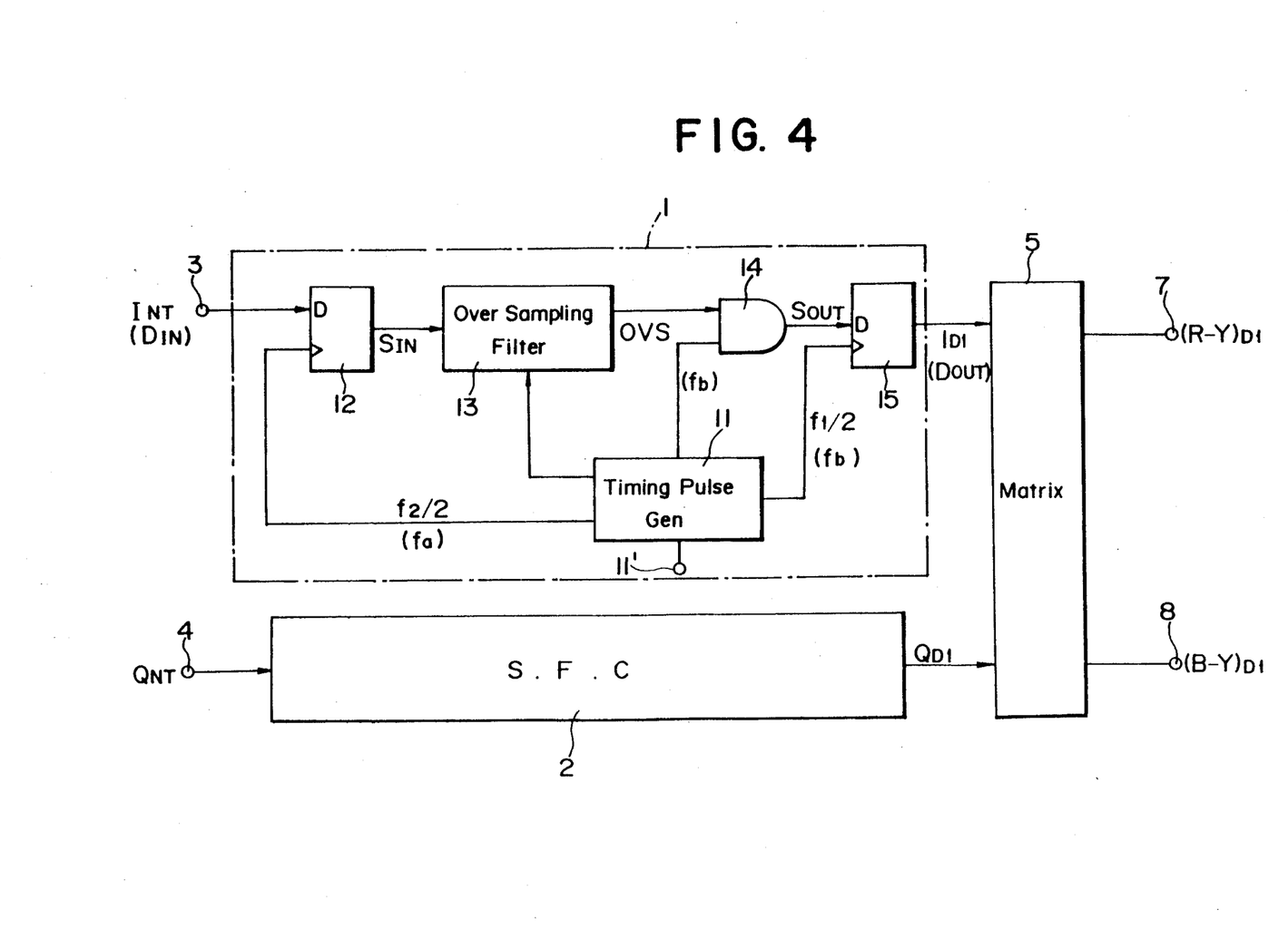
FIG. 4 is a block diagram illustrating a sampling frequency converter according to an embodiment of the present invention.
Figure 5:
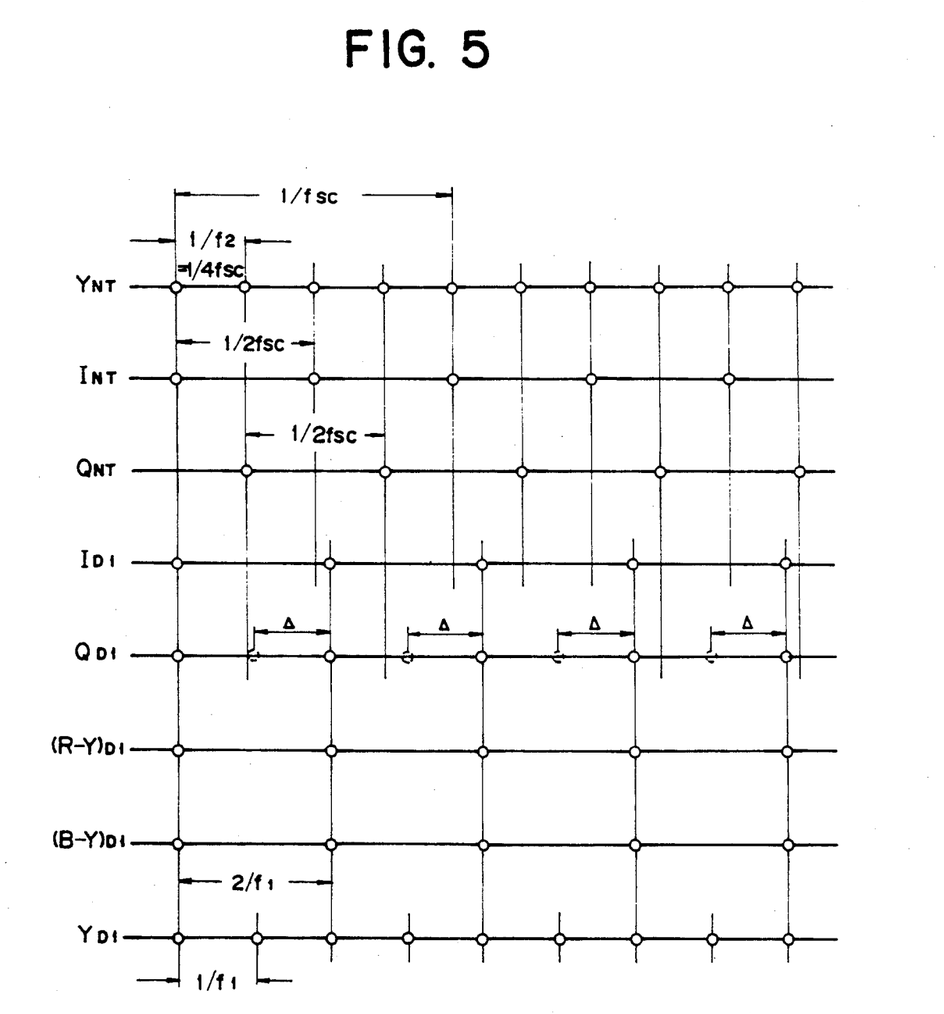
FIG. 5 is a diagram useful in understanding the operation of the embodiment shown in FIG. 4.

In the first embodiment, illustrated in FIG. 4, a sampling frequency converter is used in a format conversion apparatus designed to convert a digital composite signal with a sampling frequency $f_2(=4f_{SC})$ in the aforementioned NTSC format, into digital component signals with sampling frequency $f_1(=13.5$ MHz) in the D-1 format (4:2:2 format). As seen in FIG. 4 two parallel sampling frequency converters 1 and 2 are provided for the I and Q signals used in the NTSC format. Input terminals 3 and 4 of such sampling frequency converters 1 and 2 are fed with output signals $I_{NT}$ and $Q_{NT}$ from decoder 107 shown in FIG. 1 (i.e. the signals obtained through the I-axis and Q-axis demodulation of the carrier color signal $C_{NT}$ produced by the Y/C separation of the digital composite signal). Such signals $I_{NT}$ and $Q_{NT}$ have the same sampling frequency (data rate) of $f_2/2 = 2f_{SC}$ as mentioned previously, and the corresponding time difference (offset) between the two signals is $1/f_2 = \frac{1}{4}f_{SC}$. The timing relationship between the color difference signals $I_{NT}$ and $Q_{NT}$ and the separated luminance signal $Y_{NT}$ are illustrated in FIG. 5 (data denoted by 0). Since matrix calculations, for conversion of the coordinate axes, cannot be executed directly to obtain the R-Y and B-Y signal data due to the offset (or phase difference) between the I and Q signals at the sampling points, it has been customary to first interpolate the center timing data of the I and Q signals to obtain the signals $If_2$ and $Qf_2$ (shown in FIG. 2) with mutually equal sampling frequencies $f_2 = 4f_{SC}$ and the same sampling points. However, in this embodiment, the conversion is performed by the sampling frequency converters 1 and 2 in a mode where the phase difference (offset) $\Delta$ is included in the timing of the converted output, thereby producing frequency-converted outputs (signals $I_{D1}$ and $Q_{D1}$ in FIG. 5) without causing any time difference (offset) therebetween. The sampling frequency converters 1 and 2 produce an I signal $I_{D1}$ and a Q signal $Q_{D1}$ having a sampling frequency of $f_1/2$ (=6.75 MHz) and composed of data rows which are coincident in regard to the sampling points. Such signals $I_{D1}$ and $Q_{D1}$ are supplied to a matrix calculator 5 where the coordinates of the I and Q axes are converted into those of the R-Y and B-Y axes, so that the signals $I_{D1}$ and $Q_{D1}$ are converted respectively into color difference signals $(R-Y)_{D1}$ and $(B-Y)_{D1}$ with the aforementioned D-1 format (4:2:2 format) and then are taken out from output terminals 7 and 8, respectively. Therefore, it is not necessary to provide interpolators 108 and 109 (FIG. 1) as were necessary in the prior art thereby diminishing the required number of signal processing stages so as to minimize signal deterioration as well as to simplify the circuit constitution and reduce the cost.

A more detailed description will be give of the internal constitutions of sampling frequency converters 1 and 2 illustrated in FIG. 4. Since these two converters are the same with regard to the constitution, only one circuit (e.g. converter 1) will be examined.

Within sampling frequency converter 1, there is incorporated timing pulse generator 11 used for generating various timing pulses. The digital input signal $D_{IN}$ fed to input terminal 3 is supplied via a D flip-flop 12 to over-sampling filter 13 and thereby converted into a data row with frequency $f_S/2$ which is the least common multiple of the sampling frequencies $f_1/2$ and $f_2/2$. Such frequencies $f_1$, $f_2$ and $f_S$ are determined by satisfying the following conditions with natural numbers $n_1$ and $n_2$:

$n_1 f_1 = n_2 f_2 = f_S$ or $n_1 f_1/2 = n_2 f_2/2 = f_S/2$

Whereby the relationship between the natural numbers $n_1$ and $n_2$ is expressed as $n_1 : n_2 = f_2 : f_1$ As an example, the case of conversion between the D-1 format and the NTSC format with $4f_{SC}$ sampling frequency, the actual values of the natural numbers are $n_1 = 35$ and $n_2 = 33$, respectively. The signal data, with sampling frequency $f_S/2$, obtained from over-sampling filter 13 is selected at the rate of the sampling frequency $f_1/2$ by a selector gate 14 and then outputted via a D flip-flop 15. The clock frequency for the D flip-flop 12, on the input side, is set to $f_2/2$, and that for the D flip-flop 15, on the output side, is set to $f_1/2$. The clock signals fed into D flip-flops 12 and 15, the clock signal fed to the over-sampling filter 13 and the selection signal to the selector gate 14 are all outputted from the timing pulse generator 11.

Figure 6:
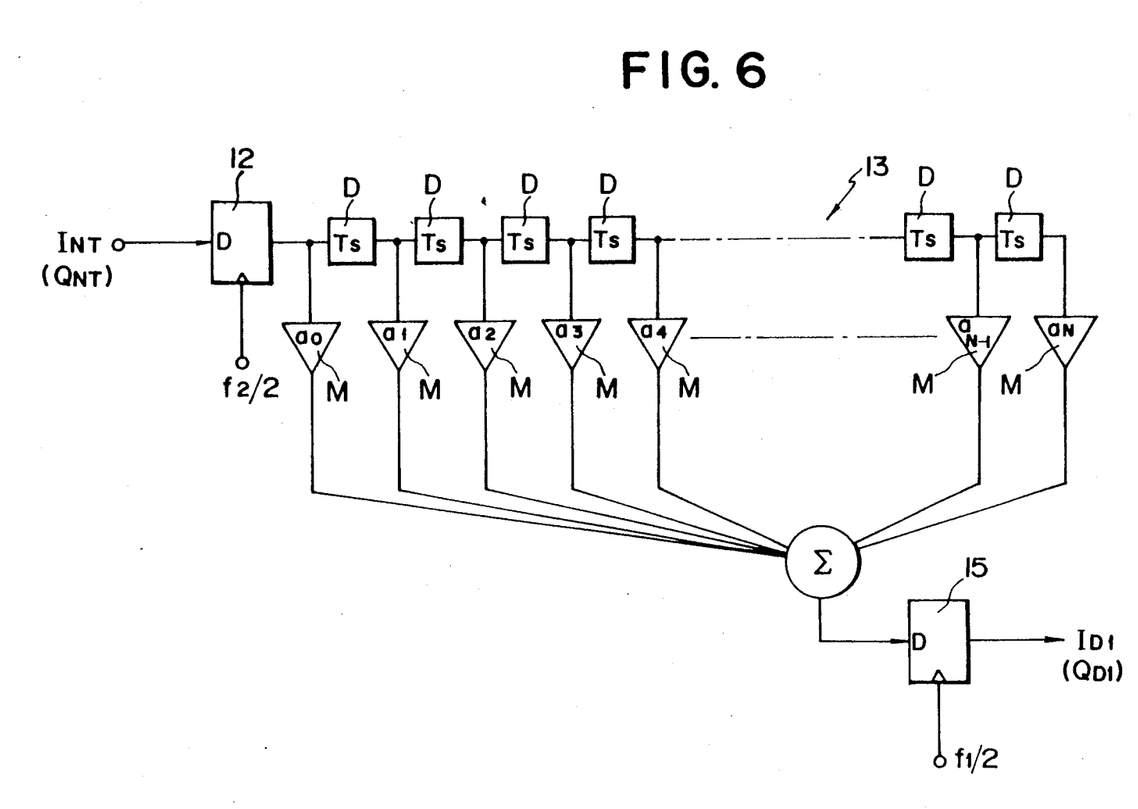
FIG. 6 is a block diagram showing an exemplary over-sampling filter that may be employed in the embodiment of FIG. 4.
Figure 7:
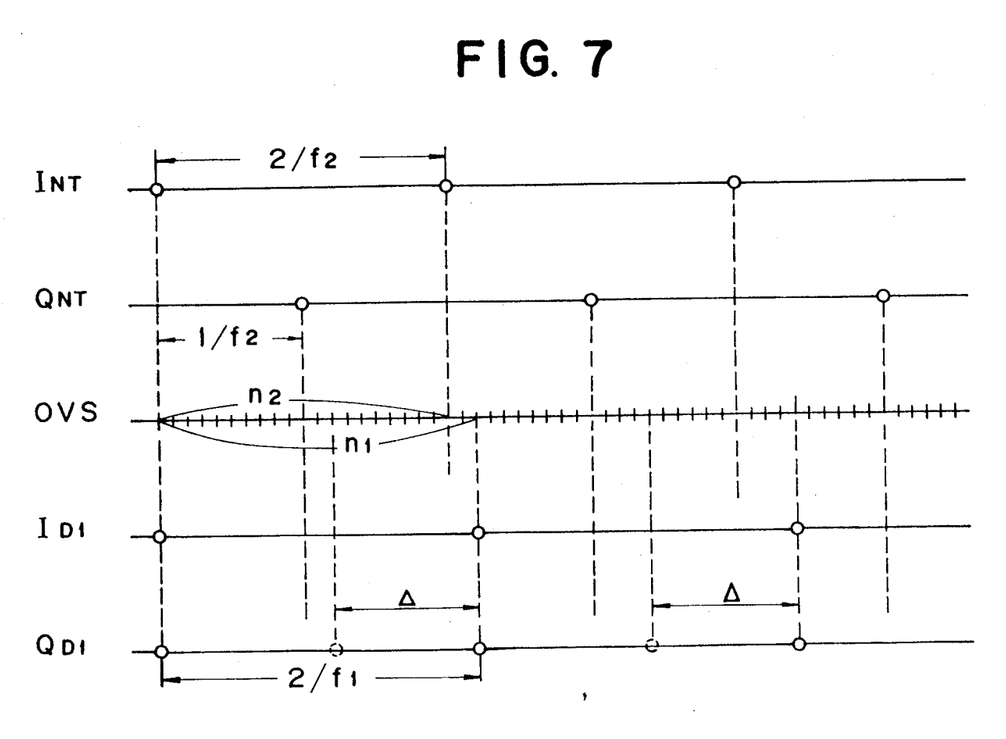
FIG. 7 is a timing chart useful in understanding the operation of the embodiment shown in FIG. 4.

The over-sampling filter 13 may be constituted by a known circuit configuration as shown in FIG. 6. The configuration shown in FIG. 6 is a non-cyclic or FIR type digital filter, wherein a plurality, e.g. N pieces (N = an integer greater than $n_2$) of delay elements D, . . ., D are connected in series to one another, and the outputs from the junctions (N+1 points including the input and output terminals of such series-connected circuit) of the delay elements are fed to N+1 pieces of coefficient multipliers M, . . ., M where the individual signals are multiplied by coefficients $a_0, a_1, \ldots, a_N$ respectively. The resultant multiplied outputs are fed to an adder $\Sigma$ and added to one another. Each delay element D has a delay time $T_S$ corresponding to the reciprocal of the aforementioned sampling frequency $f_S$ (i.e. $1/f_S$, which is the sampling period). However, the sampling period may be set to $2/f_S$ since the sampling frequencies of the input and output signals are set to $\frac{1}{2}$ (i.e. $f_1/2$, $f_2/2$) and the required over-sampling clock frequency is $f_S/2$. The over-sampling filter 13 receives the input signal $I_{NT}$ (sampling frequency $f_2/2$) via the D flip-flop 12 and produces over-sampled output data with the timing represented by OVS in FIG. 7, i.e. at each sampling point of frequency $n_2 f_2/2 (=f_S/2)$. Out of the entirety of such data, the data sampled at the timing of the frequency $f_1/2$ are extracted by the output-side of the D flip-flop 15 (or the selector gate 14 shown in FIG. 4), thereby obtaining a data row of the sampling frequency $f_1/2$. In this stage, the timing to extract the converted data is shifted to conform with a predetermined offset $\Delta$ between the I and Q signal, thereby producing a data row at the same sampling points as represented by the signal $I_{D1}$ or $Q_{D1}$ in FIG. 7. In other words, such operation can be performed by generating common phase clock pulses from timing pulse generator 11, within sampling frequency converters 1, 2 and then controlling the selector gate 14 and the D flip-flop 15 accordance with such clock pulses.

Figure 8:
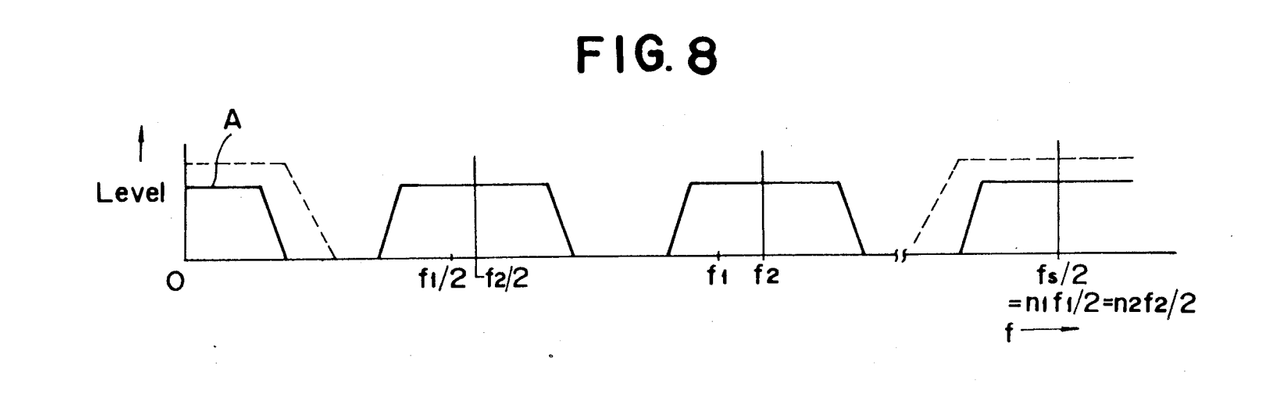
FIG. 8 is a diagram useful in understanding the operation of the over-sampling filter.

FIG. 8 graphically shows how the over-sampling operation is performed on the frequency axis. The frequency spectrum of the input signal $I_{NT}$ or $Q_{NT}$ (sampling frequency = $f_2/2$) is represented by the solid line in FIG. 8, wherein the spectral baseband component A consists of upper and lower sideband components with the center at the position corresponding to an integral multiple of the sampling frequency $f_2/2$. Whereas the over-sampling operation at the $n_2$-fold frequency signifies extraction of the baseband component A with sideband components whose center is at the position corresponding to an integral multiple of the frequency $f_S/2$, as represented by a broken line in FIG. 8. Since such frequency $f_S/2$ is also equivalent to the frequency $n_1 \cdot f_1/2$, extraction of the data at the sampling points of the frequency $f_1/2$ out of the over-sampled data row signifies an operation of obtaining a signal (not shown) composed of the baseband component A and the upper and lower sideband components whose center is at the position corresponding to an integral multiple of the frequency $f_1/2$.

The above-described embodiment represents an exemplary case of applying the sampling frequency converter of the present invention to the stages posterior to the decoder 107 in the constitution of FIG. 1. It is also possible to apply the invention to a format conversion apparatus designed to convert component digital signals of the D-1 (4:2:2) format into a composite digital signal of the NTSC format, as shown in FIG. 3. This can be accomplished by substituting the circuit illustrated in FIG. 9 with the stages from input terminals 131 and 132 through encoder 138 in FIG. 3.

Figure 9:
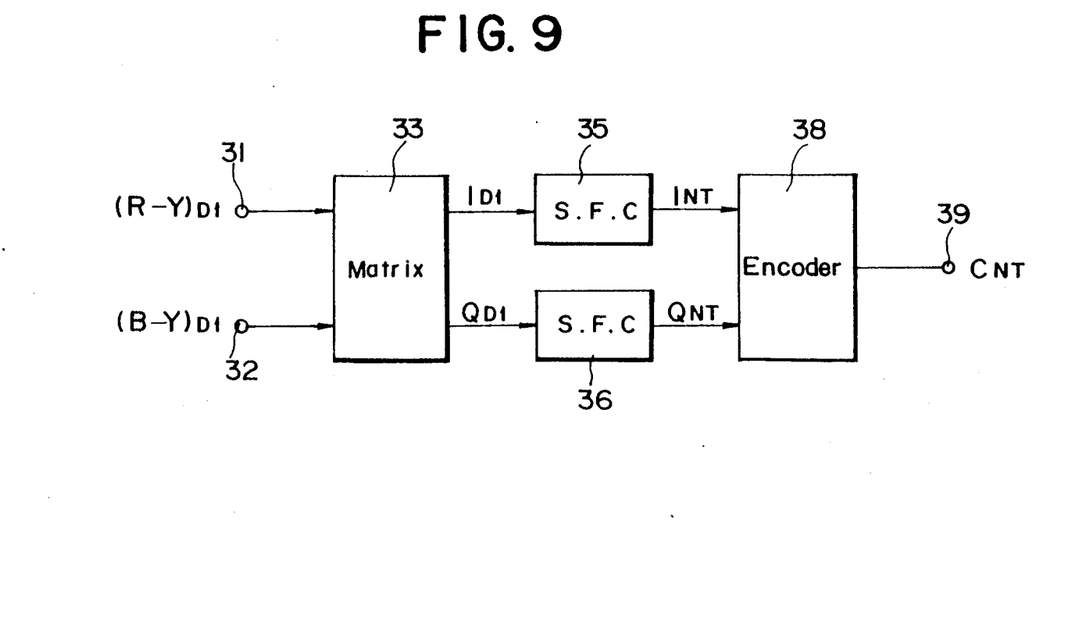
FIG. 9 is a block diagram of a sampling frequency converter according to another embodiment of the present invention.

Similar to the aforementioned input signals 131 and 132 in FIG. 3, input terminals 31 and 32 in FIG. 9 receive the color difference signals in the D-1 format (i.e. signals $(R-Y)_{D1}$ and $(B-Y)_{D1}$ each having a sampling frequency $f_1/2$). Such input signals are first fed to matrix calculator 33 to be converted respectively into an I signal $I_{D1}$ and a Q signal $Q_{D1}$ with the same frequency $f_1/2$ and with coincident sampling points, and are then fed to sampling frequency converters 35 and 36, respectively. Such sampling frequency converters 35 and 36 perform inverse operations with respect to the inputs and outputs of the aforementioned sampling frequency converters 1 and 2 in FIG. 4. That is, in the converters 35 and 36, two data rows of the signals $I_{D1}$ and $Q_{D1}$ each having a frequency $f_1/2$ with coincident sampling points are converted into two data rows of signals $I_{NT}$ and $Q_{NT}$ each having a frequency $f_2/2$ ($=2f_{SC}$) with a predetermined offset, delay or phase difference ($1/f_2 = \frac{1}{4}f_{SC}$) between the respective sampling points. The signals $I_{NT}$ and $Q_{NT}$ are fed to a color encoder 38, which is functionally equal to the aforementioned color encoder 138 in FIG. 3 and executes a quadrature two-phase modulation to produce a digital carrier color signal $C_{NT}$ in the NTSC format at output terminal 39. The digital carrier color signal $C_{NT}$, thus obtained, is superimposed on a digital luminance signal $Y_{NT}$ converted individually with respect to the sampling frequency thereof, producing a digital composite signal in the NTSC format.

Therefore, as illustrated in the embodiment of FIG. 9, the circuit can be simplified, when compared to the prior art, which reduces the cost as well as diminishes the required number of signal processing stages which consequently minimizes the signal deterioration.

It is to be understood that the present invention is not limited to the above embodiment alone. For example, the specific constitution of the over-sampling filter is not limited merely to the example of FIG. 6, there may be contrived some modification such as changing the individual coefficient values of the coefficient multipliers per sampling time for simplifying the constitution, and a cyclic type or digital filter may also be employed. The sampling frequency converter may be composed of an interpolation processing circuit without the necessity of using any over-sampling filter. In such a case, conversion of the sampling frequency (data rate) may be executed by first driving the interpolator to sequentially calculate the data which correspond to the output timing data of the conversion frequency and then attaining a coincidence between the latch timing of a flip-flop or the like and the conversion frequency. Furthermore, the present invention is applicable not merely to the aforementioned format conversion alone, but also to a variety of sampling frequency conversions performed while retaining a time difference (phase delay) between two or more digital signals. It is a matter of course that, in addition to the above, various modifications and changes may be contrived within the scope yet not departing from the spirit of the present invention.

According to the sampling frequency converter of the present invention, the frequency conversion is so executed that a predetermined time delay is caused in the input and output timing for frequency conversion of the first digital signal as compared with the input and output timing frequency conversion of the second digital signal, so that an interpolation can be performed simultaneously with the sampling frequency conversion, hence eliminating the necessity of individually providing interpolators and sampling frequency converters to consequently attain prevention of signal deterioration as well as to simplify the circuit constitution.

A description will now be given of another embodiment shown on FIG. 4, and which is a control method for compensation of the relative group delay difference between a luminance signal line ($Y_{NT}$) and a chrominance signal line ($C_{NT}$).

In this embodiment, a delay control signal is supplied via input terminal 11' to timing pulse generator 11 which is incorporated within the I-signal and Q-signal sampling frequency converters 1 and 2 (or within the luminance-signal sampling frequency converter 103 in FIG. 1), and either the timing of a selection signal to selector gate 14 or the phase of a clock signal to D flip-flop 15 is controlled in accordance with such delay control signal.

Figure 10:
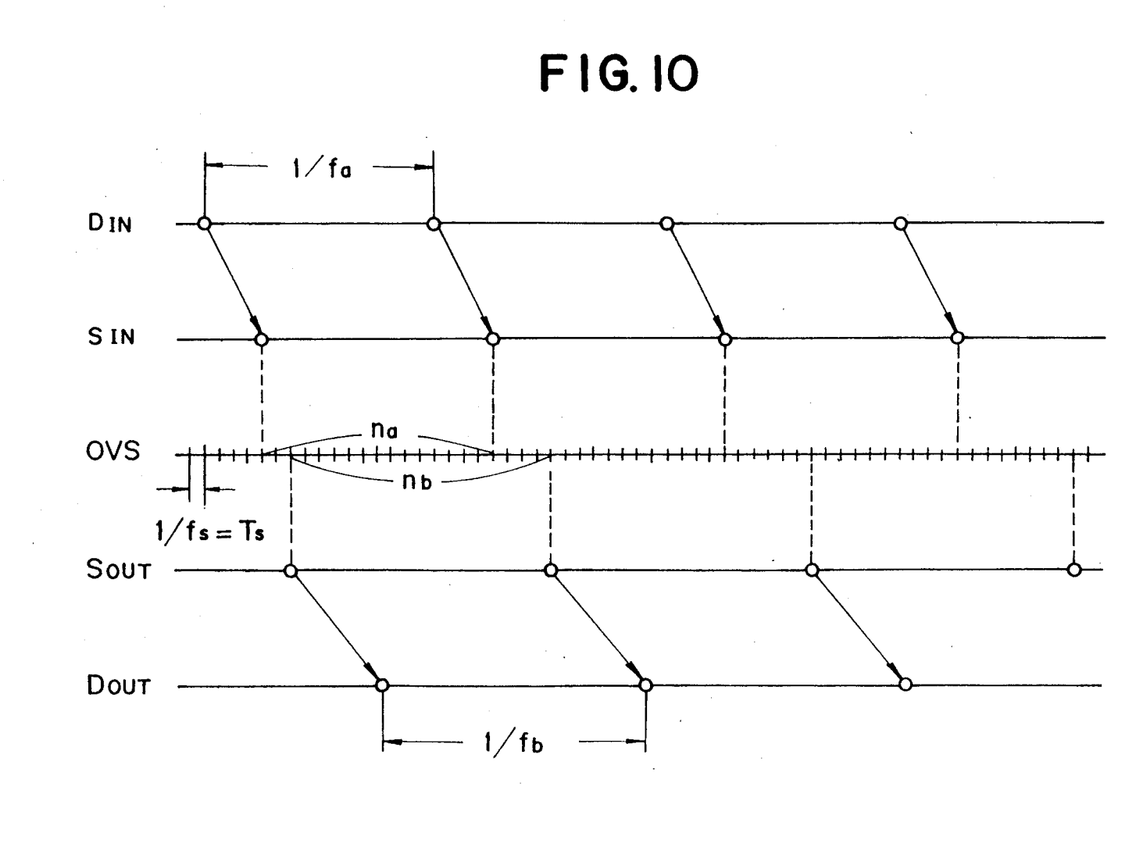
FIG. 10 is a timing chart useful in understanding the operation of a third embodiment of the invention.

In FIG. 4, the input digital signal $D_{IN}$ fed to input terminal 3 has a sampling frequency $f_a$ as shown in FIG. 10. Here, the data $D_{IN}$ is not limited to the signal $I_{NT}$ alone and is used as a general term to represent an input digital signal such as $Q_{NT}$ or $Y_{NT}$. The signal $D_{IN}$ is supplied to D flip-flop 12, which is then latched by a clock pulse with frequency $f_a$ fed from timing pulse generator 11 thereto, whereby a signal $S_{IN}$ is obtained. The signal $S_{IN}$ is somewhat delayed from the input digital signal $D_{IN}$ as shown in FIG. 10. Such signal $S_{IN}$ is supplied to over-sampling filter 13, whereby output signal OVS (FIG. 10) is obtained from filter 13 at each sampling point of the over-sampling frequency $f_s$, i.e. per period $T_s$.

The desired data is selectively extracted therefrom per sampling point, with a period of $1/f_b$, by selector gate 14, so that a signal $S_{OUT}$ is produced. Such data extraction timing is controlled in accordance with the delay control signal introduced via input terminal 11', thereby controlling the group delay amount of the signal. The timing provided each data of the final output signal $D_{OUT}$ from the sampling frequency converter is controlled by the output-side D flip-flop 15, and the delay amount between the signals $S_{OUT}$ and $D_{OUT}$ is varied in accordance with the output phase change in each data of the signal $S_{OUT}$. The adjustment of the delay amount is controllable at a unitary over-sampling period $1/f_s$ as illustrated in FIG. 10, and therefore the control precision can be enhanced $n_b$ times in comparison with the prior art. Accordingly, when the above embodiment is applied to sampling frequency converters 103, 111 and 112 in the aforementioned format conversion apparatus of FIG. 1, the group delay correction error between the luminance signal and the color difference signal can be restricted to a maximum of about ±1.05 ns, and such error exerts no harmful influence on the reproduced image at all.

For executing interpolation, with a typical predetermined desired accuracy, the exemplary arrangement of the over-sampling filter shown in FIG. 6, would require over 100 delay stages D and an equal number of multipliers M, thereby resulting in a disadvantage in that a practical arrangement is thereby rendered extremely bulky.

Another embodiment of the invention will now be described employing a novel over-sampling filter of a simple structure which is capable of eliminating the drawbacks observed in the aforementioned over-sampling filter.

Figure 11:
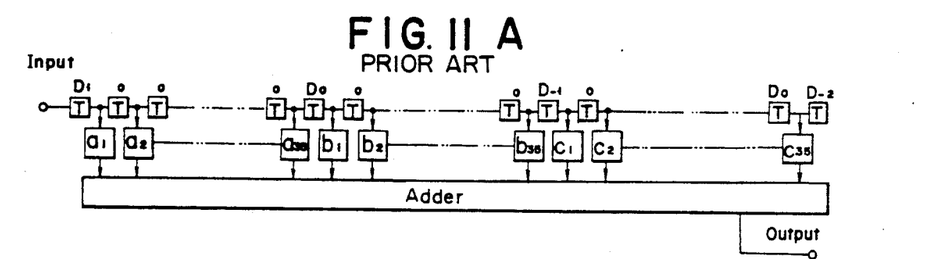
FIGS. 11A and 11B are block diagrams illustrating an over-sampling filter according to the prior art and according to an embodiment of the present invention, respectively.

FIG. 11A shows the constitution of a conventional over-sampling filter used to convert a chrominance signal $(R-Y)_{D1}$ or $(B-Y)_{D1}$ of the D1 format having a sampling frequency 6.75 MHz into an $I_{NT}$ or $Q_{NT}$ signal of the NTSC format. The chrominance signal $(R-Y)_{D1}$ or $(B-Y)_{D1}$ having a sampling frequency 6.75 MHz is supplied to an input terminal. Connected in series to the input terminal are required number of delay circuits T each having a delay time corresponding to one period ($=1/N$ (6.75 MHz) where N is the number of delay circuits T). The number of such delay circuits T is at least 35 and is dependent on the precision of interpolation. That is, the interpolation accuracy is enhanced by increasing the number of such delay circuits T. Multipliers $a_1, a_2 \ldots a_{35}, b_1, b_2$ and so forth are connected to and multiplied by the respective outputs of the delay circuits T. The outputs of such multipliers are supplied to an adder, where the entire multiplied outputs are added to one another. Consequently the adder provides, from its output terminal, an over-sampled digital signal whose frequency is 35 times the frequency 6.75 MHz of the input digital signal.

By extracting the signals obtained at the output terminal in FIG. 11A, R-Y and B-Y signals, converted with regard to the sampling frequency, can be obtained at a frequency of $2f_{SC}$, but there arises a disadvantage in practical use in that large numbers of delay circuits T and multipliers are required (similar to that required in the above mentioned conventional example). Since the frequency of the input digital signal is 6.75 MHz, it is considered that the signal exists merely in one of the 35 delay circuits at a certain timing, whereas, 0 signals exists equivalently in the outputs of the other delay circuits. Therefore, if such outputs are multiplied by any coefficient, the multiplied outputs become 0 so that, from the view of the adder output the result appears as if there are not outputs from the multipliers.

The following embodiment has been accomplished in consideration of the points mentioned above. That is, its feature resides in omitting multipliers which multiply 0 by the coefficients, and also omitting any unrequired delay circuits.

The constitution of this embodiment is shown in FIG. 11B, wherein a digital signal such as $(R-Y)_{D1}$ or $(B-Y)_{D1}$, having a sampling frequency of 6.75 MHz as in the foregoing embodiment is fed to input terminal 200. When such an input digital signal is supplied to a latch circuit 201, the data thereof are held during one period of the sampling frequency 6.75 MHz of the input digital signal. In other words, latch circuit 201 continuously provides output data $D_1$ during one such period. Similarly, the next-stage latch circuit 202 provides output data $D_0$ anterior to the foregoing data $D_1$ by one sample, and thereafter the next latch circuit 203 provides output data $D_1$ further anterior to the data $D_0$ by one sample.

A ROM 204a connected to the output of latch circuit 201 sequentially stores, at predetermined addresses therein, coefficient data corresponding to $a_1, a_2 \ldots a_{35}$ shown in FIG. 11A. Similarly a ROM 204b connected to the output of latch circuit 202 sequentially stores, at predetermined addresses therein, coefficient data corresponding to $b_1, b_2 \ldots b_{35}$ shown in FIG. 11A. Furthermore, a ROM 204c connected to the output of the latch circuit 203 sequentially stores, at predetermined addresses therein, coefficient data corresponding to $c_1, c_2 \ldots c_{35}$ shown in FIG. 11A. Individual multipliers 205a, 205b and 205c (not shown in FIG. 11A), are connected to the corresponding ROM and to the corresponding latch circuits and provide multiplied outputs to adder 206.

It is obvious that the interpolation accuracy can be further enhanced to meet predetermined requirements by providing additional similar circuits 204d, 204e and so forth.

When it is desired to obtain an output equivalent to that obtained with the over-sampling filter shown in FIG. 11A, the coefficient data are sequentially read out from the ROMs 204a, 204b, 204c per period of a frequency, which is 35 times the sampling frequency 6.75 MHz of the input digital signal, in response to the outputs of the individual latch circuits, then the coefficients thus read out are multiplied in multipliers 205a, 205b, 205c, and the results of such multiplications are added to one another in adder 206, whereby the data, over-sampled at the frequency of $35 \times 6.75$ MHz, are obtained from output terminal 207. Due to the constitution of FIG. 11B, the numbers of at least the delay circuits and the multipliers can be reduced to about 1/35 as compared with those in the constitution of the conventional over-sampling filter shown in FIG. 11A, which also results in considerable simplification of the adder constitution as well.

Generally a phase offset of about 33° is existent between the R-Y/B-Y axis and the I/Q axis with respect to the frequency of the color subcarrier.

The above-described phase offset can be represented as $$\frac{33}{360} = \frac{11}{120}.$$

Thus, where one wave length of the color subcarrier is divided into 120 equal parts, the offset corresponds to a point spaced apart by 11 parts. And in the double color subcarrier, the offset corresponds to a point spaced apart by 11 parts when one wave length is divided into 60 equal parts. Due to the above over-sampling operation, there is obtained a signal of 33-fold frequency of the double color subcarrier ($2f_{SC}$), whereby it is rendered equivalent so that the data are extracted at each of the equally divided 33 parts of the double color subcarrier.

Here, consideration will be given on how to determine which of the equally divided 33 parts of the double color subcarrier corresponds to the phase difference of $$\frac{11}{60}.$$

This case conforms to a calculation involving an integer N under the condition of $11/60 \simeq N/33$. Suppose N=6, $$\frac{11}{60} = 0.183 \ldots ; \frac{6}{33} = 0.182 \ldots$$

This signifies that the error between them is less than $$\frac{1}{100}$$

as compared with $$\frac{11}{60}.$$

The error is expressed as $$\frac{1}{7.16} \text{ MHz} \times \frac{11}{60} \times \frac{1}{100} \approx 0.3 \text{ nsec}$$

Thus, its value is so small as to be completely negligible in practical use.

In the apparatus of FIG. 11B, the coefficients $a_6$, $b_6$, $c_6$ and so forth are selectively read out from the 6th addresses in the ROMs 204a, 204b, 204c . . . at the sampling timing of the first color subcarrier wave posterior to one horizontal synchronizing signal, and the outputs of the latch circuits 201, 202, 203 multiplied by such coefficients are added to one another. After the lapse of 33 periods of the sampling frequency 35×6.75 MHz, the coefficients spaced apart by 33 addresses are read out and used for multiplication, thereby producing a signal whose sampling phase is shifted with the rate conversion.

Since the 33 periods of the sampling frequency 35×6.75 MHz are substantially equal to the period of the frequency $2f_{SC}$, it follows that multiplication of the coefficient per 33 periods corresponds exactly to periodic multiplication of the coefficient and extraction of the signal per period of the frequency $2f_{SC}$, whereby the sampling frequency conversion is achieved.

According to the apparatus mentioned above, both the sampling rate conversion and the sampling phase shift can be performed simultaneously at the time of format conversion of the digital video signals, hence attaining satisfactory conversion in the simplified constitution.

For converting a digital composite video signal in the NTSC format into digital component signals in another format, the above apparatus may be so formed as to perform an inverse operation. In such a case, an input composite digital signal is introduced to a separator which separates the input signal into a luminance signal Y and I/Q axis signals, whereby such I & Q signals are then supplied to a matrix circuit to produce two color difference signals R-Y and B-Y. Subsequently the signals thus obtained are fed to data latch circuits, multipliers, ROMs and an adder to execute both rate conversion and shift of the sampling axis, thereby forming digital video signals in the component format.

It is to be understood that the above-described embodiment is applicable also to conversion between the digital video signal of the composite format conforming with the PAL system and the video signal of the component (D-1) format, although the thus constituted apparatus is somewhat complicated.

What is claimed is:

1. A sampling frequency converter for converting sampled input data having an input sampling frequency into sampled output data having a different output sampling frequency, comprising:
   over-sampling means supplied with said sampled input data for increasing the sampling frequency of said sampled input data by a factor n to provide over-sampled data;
   means for generating a timing pulse having said output sampling frequency;
   output data extractor means for periodically extracting data from said over-sampled data in response to said timing pulse; and
   control means for controlling the timing of said timing pulse to control the phase of said sampled output data.

2. A sampling frequency converter according to claim 1, wherein one of said sampled input and output data is a digital color signal in a digital composite color signal format, and another of said sampled input and output data is a digital color signal in a digital component signal format.

3. A sampling frequency converter according to claim 1, wherein one of said sampled input and output data is a digital luminance signal in a digital composite color signal format, and another of said sampled input and output data is a digital luminance signal in a digital component signal format.

4. A sampling frequency converter according to claim 3, wherein said sampled input and output data further include a digital color signal, and wherein said control means controls the timing of said timing pulse in such a manner that a delay imparted to said digital luminance signal becomes equal to a delay imparted to the digital color signal.

5. A sampling frequency converter according to claim 1, wherein said n equals the ratio of the least common multiple of said input and output sampling frequencies to the input sampling frequency.

6. A sampling frequency converter according to claim 1, wherein said over-sampling means includes serially connected latch circuits supplied with said sampled input data for latching the same for one sampling period of said sampled input data, multiplier means connected to the output of each of said latch circuits, ROM means connected to each of said multiplier means for storing a plurality of coefficient data which are read out selectively in a predetermined order and supplied to said corresponding multiplier means for multiplying in the latter by the output of said latch circuit, and adder means for adding the outputs of said multiplier means together; and wherein said output extractor means includes an address controller for controlling the read address of said ROM means with the frequency corresponding to said output sampling frequency.

* * * * *